(12) United States Patent
Catt et al.

(10) Patent No.: US 11,099,973 B2
(45) Date of Patent: Aug. 24, 2021

(54) AUTOMATED TEST CASE MANAGEMENT SYSTEMS AND METHODS

(71) Applicant: salesforce.com, inc., San Francisco, CA (US)

(72) Inventors: Joshua Catt, Westfield, IN (US); Jim Ostrognai, Zionsville, IN (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/259,704

(22) Filed: Jan. 28, 2019

(65) Prior Publication Data

US 2020/0242015 A1 Jul. 30, 2020

(51) Int. Cl.
*G06F 11/36* (2006.01)
*G06F 16/9038* (2019.01)

(52) U.S. Cl.
CPC ...... *G06F 11/3684* (2013.01); *G06F 11/3664* (2013.01); *G06F 11/3688* (2013.01); *G06F 11/3692* (2013.01); *G06F 16/9038* (2019.01)

(58) Field of Classification Search
CPC ............. G06F 11/3684; G06F 11/3664; G06F 11/3688; G06F 11/3692; G06F 16/9038
USPC ...................................................... 717/124
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |

(Continued)

*Primary Examiner* — Chat C Do
*Assistant Examiner* — Bradford F Wheaton
(74) *Attorney, Agent, or Firm* — LKGlobal | Lorenz & Kopf, LLP

(57) ABSTRACT

Computing systems, database systems, and related methods are provided for managing test cases. One method involves a server receiving a first test result message, automatically generating a first test case definition based on a subset of the fields of metadata associated with the first test result message, and creating an entry in the database that maintains an association between the first test case definition and the first test results. The method continues by receiving a second test result message, automatically generating a second test case definition based on the subset of the fields of metadata associated with the second test result message, and updating a database to maintain an association between the first test case definition and the second test results when the second text case definition matches the first test case definition. Relationships between test results that share a common definition are thereby maintained in an automated manner.

16 Claims, 8 Drawing Sheets

(56) References Cited

U.S. PATENT DOCUMENTS

| | | |
|---|---|---|
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,232,420 B1* | 1/2016 | Akiti ............... H04W 24/06 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0181713 A1* | 9/2004 | Lambert ............ G06F 11/3684 714/48 |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2007/0074012 A1* | 3/2007 | Graham ............... G06F 13/28 712/227 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2012/0304157 A1* | 11/2012 | Kawashima ........ G06F 11/3692 717/131 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0109046 A1* | 4/2014 | Hirsch ................ G06F 9/44 717/120 |
| 2014/0188803 A1* | 7/2014 | James ................ G06F 11/1451 707/638 |
| 2015/0092564 A1* | 4/2015 | Aldrin ............... H04L 41/5038 370/241.1 |
| 2017/0093767 A1* | 3/2017 | Chinnapatlolla ....... H04L 51/08 |
| 2019/0266275 A1* | 8/2019 | Wernze ............ G06F 16/24539 |

\* cited by examiner

AUTOMATED TEST CASE MANAGEMENT SYSTEMS AND METHODS

TECHNICAL FIELD

Embodiments of the subject matter described herein relate generally to database systems, and more particularly, to methods and systems that support automated test case management using a database system.

BACKGROUND

Modern software development often employs testing in order to eliminate as many errors or "bugs" as possible before the software is released for widespread use. Automated software testing techniques are often utilized to verify that a program performs consistent with its specified or intended behavior. Unit testing is one method of automated testing that targets individual functions, procedures, or other portions of source code, for example, by isolating parts of a software program to show that the individual constituent parts are correct. To this end, test cases are often created that specify the inputs, execution conditions, testing procedure, testing results, and/or the like that in combination define the respective tests to be performed on a given software program. Test cases are typically written for all functions and methods so that whenever a change causes a fault, it can be quickly identified and fixed, thereby ensuring that code meets its design and behaves as intended early in the development cycle.

Traditionally, a test case management system maintains the test case code in association with a corresponding definition of the objective associated with the test case. However, during development, one or more members of a development team may make changes to the test case code and/or the source code for the software, such that the functionality or behavior of the test case diverges from its initial definition or intended objective. Thus, maintaining up-to-date test cases and definitions can be time consuming and prone to user error or lapses. Accordingly, it is desirable to improve test case management and account for the dynamics of the software development cycle.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to database systems and methods for managing test cases in an automated manner. In exemplary embodiments, test results are provided to the test case management system in a defined message format that includes the test result payload along with fields of metadata characterizing the test. For each test result message, a subset of the metadata fields is utilized to automatically generate a test case definition for the test that produced the associated test results. The automated test case definitions are utilized to create database entries that maintain associations between test case definitions and received test results for those test case definitions. In this regard, when the automated test case definition generated for a subsequently received test result message matches the test case definition associated with an existing entry in the database, the test results from the payload of that subsequent test result message may be stored or otherwise maintained in the database in association with the existing entry matching that automated test case definition. Thus, test case definitions are automatically generated using test results and managed in a manner that allows for maintaining relationships between test results sharing the same automated test case definition. As a result, developers or other users do not have to independently maintain or update test case definitions as changes are made to the underlying code for the various test cases or software programs in development. Additionally, the manner in which test case definitions are generated and relationships between test results and test case definitions are maintained facilitate the generation of dashboards and other graphical user interface (GUI) displays that summarize test results and allow users to drill down into test results.

Figure 1:
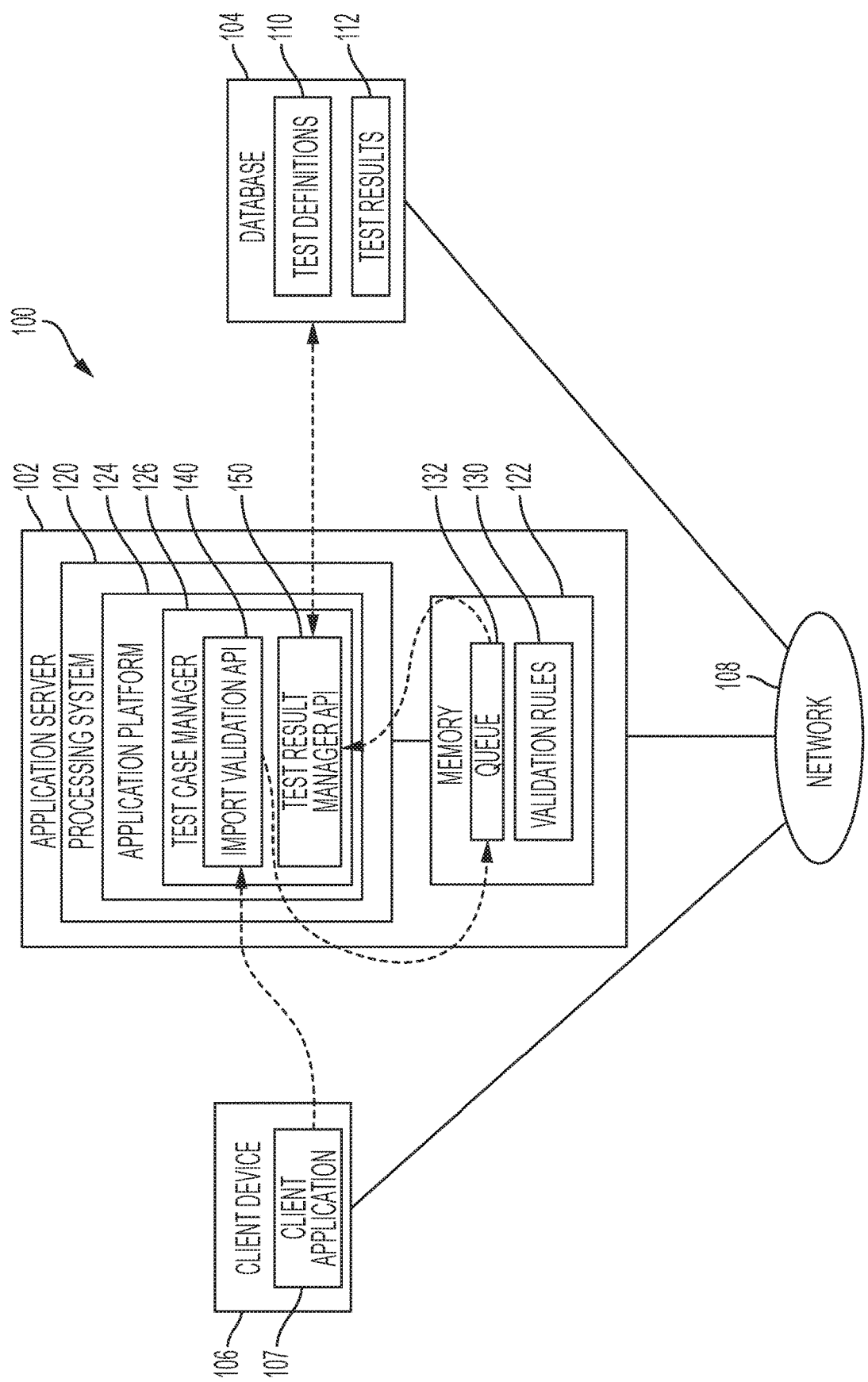
FIG. 1 is a block diagram of an exemplary computing system.

FIG. 1 depicts an exemplary embodiment of a computing system 100 capable of providing dynamic and automated test case management based on test results provided by one or more client devices 106. In the illustrated embodiment, a server 102 is communicatively coupled to a database 104 and one or more instances of client devices 106 via a communications network 108. The communications network 108 may be realized as any sort or combination of wired and/or wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 may be present, with any number of instances of applications being provided by the server 102 to various instances of client devices 106. Additionally, practical implementations may include multiple instances of the server 102 and/or the database 104, which, in turn may reside behind or rely on one or more load balancers to manage resource utilization, as will be appreciated in the art.

The server 102 generally represents a computing device, computing system or another combination of processing logic, circuitry, hardware, and/or other components configured to support the test case management processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random-access memory (RAM), read only memory (ROM), flash memory, magnetic or optical mass storage, or any other suitable non-transitory short or long-term data storage or other computer-readable media, and/or any suitable combination thereof. In one or more embodiments, the programming instructions cause the processing system 120 to create, generate, or otherwise facilitate an application platform 124 that supports or otherwise facilitates the automated test case management processes, tasks, operations, and/or functions described herein. In some embodiments, the application platform 124 may also generate or otherwise provide instances of a virtual application at run-time (or "on-demand") based at least in part upon code and other data that is stored or otherwise maintained by the database 104, such that the server 102 functions as an application server 102.

In exemplary embodiments, the programming instructions also cause the processing system 120 to create, generate, or otherwise facilitate a test case management application 126 (or test case manager) that supports storing or otherwise maintaining test results received from the client device(s) 106 in the database 104, as described in greater detail below. Depending on the embodiment, the test case manager 126 can be integrated with or otherwise incorporated as part of a virtual application, or be realized as a separate or standalone process, application programming interface (API), software agent, or the like that is capable of interacting with the client device 106 independent of any virtual application to perform actions with respect to the database 104.

The client device 106 generally represents an electronic device coupled to the network 108 that may be utilized by a user to write or develop test cases and/or source code, execute test cases on source code, provide test results to the server 102 for storage in the database 104, and/or access the application platform 124 on the server 102 to retrieve, view, and/or analyze test result data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like.

In exemplary embodiments, the database 104 stores or otherwise maintains data for integration with or invocation by a virtual application in objects organized in object tables. In this regard, in the illustrated embodiment, the database 104 includes a plurality of different object tables 110, 112 configured to store or otherwise maintain test result data 112 in association with automatically generated test case definitions 110. For example, in one or more embodiments, the database 104 maintains a test case definitions table 110 that includes alphanumeric values, metadata, or other descriptive information that define a particular test case that was automatically generated based on a received test result, along with a unique identifier assigned to the respective test case definition. A test results table 112 includes the values or other testing information characterizing the performance or results of executing a test case in association with the unique identifier assigned to the test case definition generated for that test case, thereby maintaining an association between test case definition in the test case definitions table 110 and the results for that corresponding test case in the test results table 112.

For example, in one exemplary embodiment, the test case definitions table 110 corresponds to a TestCase object type, where each row or entry in the test case definitions table 110 corresponds to a different TestCase object. In this regard, the test case definitions table 110 may include a ID column that stores or otherwise maintains the unique identifier assigned to each respective TestCase object entry. As described in greater detail below, the unique identifier assigned to a respective TestCase object may be generated by concatenating or otherwise combining values from different metadata fields of a test result message. For example, as described in greater detail below in the context of FIGS. 2-3, the value of the test case name field (e.g., TestCaseName), the value of the test group name field (e.g., TestGroupName), the value of the product identifier field (e.g., ProductTagGusId), and the value of the release identifier field (e.g., ReleaseName) may be combined to create a unique string value to be associated with a particular test case definition.

In exemplary embodiments, the test case definitions table 110 also includes one or more additional columns configured to support logical or hierarchical groupings of test case definitions and results that enable drill-downs into test case definitions and results, as described in greater detail below. In this regard, in some embodiments, the test case definitions table 110 may include additional columns corresponding to one or more metadata fields of the test result message utilized to generate the test case definition. For example, one column of the test case definitions table 110 may maintain the test group associated with the respective test case definition (e.g., the TestGroupName) to enable grouping test case definitions by a common test group. Similarly, additional columns of the test case definitions table 110 may individually maintain the product identifier, release identifier, or other metadata fields used to generate the test case definition to enable logical or hierarchical groupings that enable drill-downs into test case definitions and results, as described in greater detail below.

In yet other embodiments, to support logical or hierarchical groupings, the database 104 may maintain separate tables corresponding to different metadata fields utilized to generate test case definitions. For example, the database 104 may maintain a test group table, where each entry includes a first column maintaining a unique identifier assigned to the test group and a second column maintaining an identifier assigned to a parent entity of the test group in another table in the database 104 (e.g., a particular product in a product table). In this regard, the database 104 may also maintain a product table, where each entry includes a first column maintaining a unique identifier assigned to the product and a second column maintaining an identifier assigned to a parent entity in another table in the database 104 (e.g., a particular release in a release table). Thus, for the above example, the test case entry may maintain an association between the unique test case identifier (e.g., the concatenation of the TestCaseName, TestGroupName, ProductTagGusld and ReleaseName fields) and the corresponding the identifier assigned to the entry for its associated test group in the test group table, while that test group entry maintains an association between that unique test group identifier and the identifier assigned to the entry for its associated product in the product table, with that product entry maintaining an association between that unique product identifier and the identifier assigned to the entry for its associated release in a release table.

Still referring to FIG. 1, in various embodiments, the database 104 may also store or otherwise maintain other object tables for various types of objects that may be incorporated into or otherwise depicted or manipulated by a virtual application, with each different type of object having a corresponding object table that includes columns or fields corresponding to the different parameters or criteria that define a particular instance of that object. In this regard, the database 104 may also store or maintain graphical user interface (GUI) objects that include columns or fields that define the layout, sequencing, and other characteristics of GUI displays to be presented by the application platform 124 on a client device 106. For example, in one exemplary embodiment, the database 104 also includes a dashboard table that maintains one or more dashboard GUI displays and one or more report visualizations associated therewith for graphically depicting the qualitative or quantitative performance associated with one or more test case definitions. For example, one or more bar charts, pie charts, gauge charts, tabular charts, and/or the like may be provided on a dashboard GUI display to depict the qualitative distribution of the results for a given test case definition, along with other graphical indicia or depictions of quantitative metrics associated with a particular test case definition or the test results associated therewith.

Figure 2:
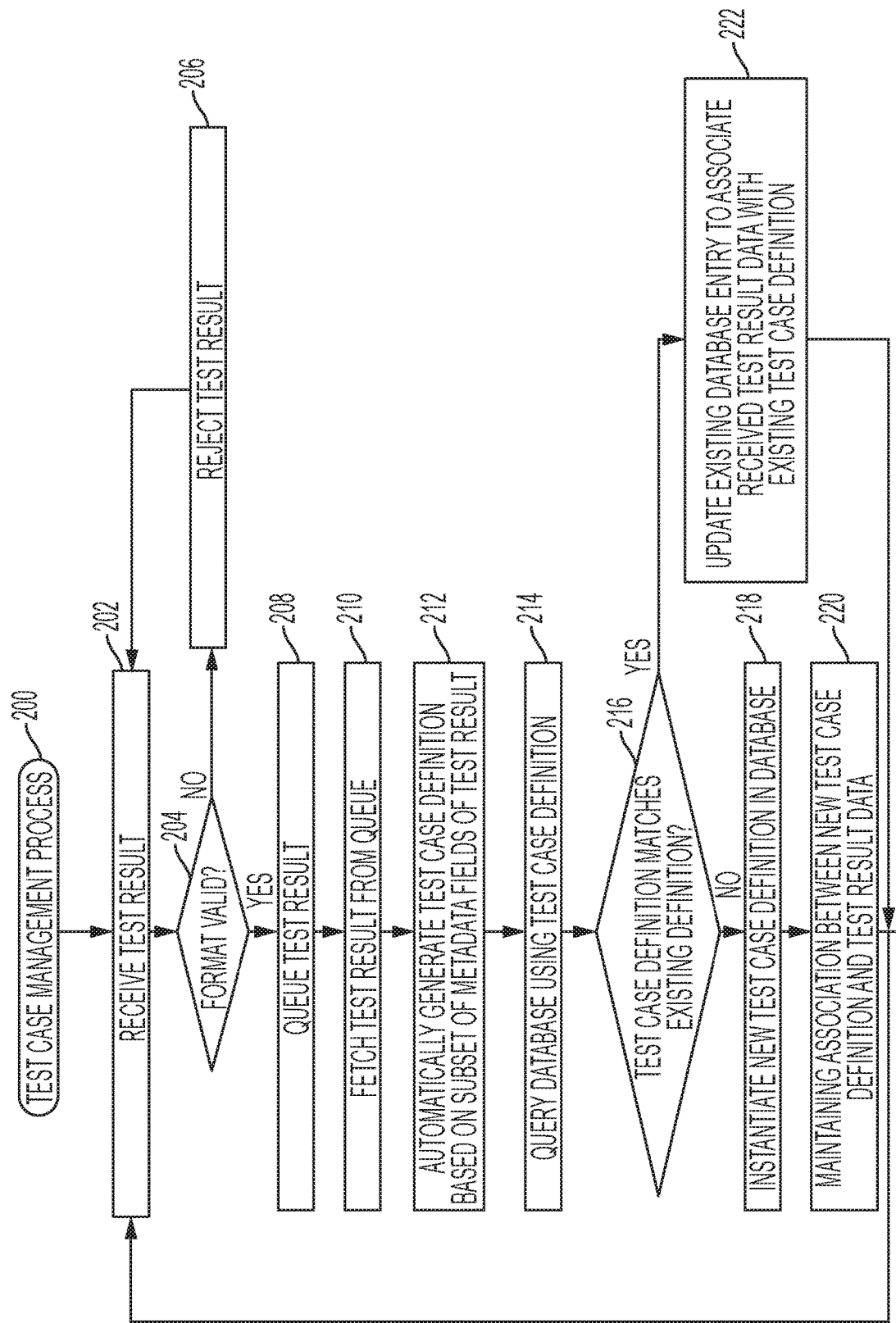
FIG. 2 is a flow diagram of an exemplary test case management process suitable for implementation in the computing system of FIG. 1 in accordance with one or more embodiments.

FIG. 2 depicts an exemplary embodiment of a test case management process 200 suitable for implementation in the computing system 100 to dynamically and automatically generate test case definitions and maintain associations between test results sharing the same test case definition. For illustrative purposes, the following description may refer to elements mentioned above in connection with FIG. 1. In this regard, while portions of the test case management process 200 may be performed by different elements of the computing system 100, for purposes of explanation, the subject matter is described herein in the context of the test case management process 200 being primarily performed by the application platform 124 and/or the test case manager 126 that are implemented or executed by the processing system 120 at the server 102. It should be appreciated that the test case management process 200 may include any number of additional or alternative tasks, the tasks need not be performed in the illustrated order and/or the tasks may be performed concurrently, and/or the test case management process 200 may be incorporated into a more comprehensive procedure or process having additional functionality not described in detail herein. Moreover, one or more of the tasks shown and described in the context of FIG. 2 could be omitted from a practical embodiment of the test case management process 200 as long as the intended overall functionality remains intact.

Referring to FIG. 2 with continued reference to FIG. 1, the test case management process 200 initializes or otherwise begins receiving a test result message and verifying or otherwise confirming the test result message was provided in the proper format (tasks 202, 204). In this regard, a user at the client device 106 may utilize the client application 107 to initiate or otherwise execute a test case on a portion of source code at the client device 106 and then provide the results of executing the test case to the test case manager 126 on the server via the network 108. For example, in one embodiment, the client application 107 performs an API call to provide the test results to an import validation API 140 provided by the test case manager 126. Depending on the embodiment, the test case code and/or the source code to be tested may be developed and maintained at the client device 106 or at another location retrievable by the client device 106 over the network 108. For example, in some embodiments, the source code to be tested may be stored or otherwise maintained in the database 104 and correspond to a portion of a virtual application to be implemented or otherwise supported by the application server 102, in which case the test case may be executed with respect to an instance of the virtual application provided at the client device 106 by the application server 102 via the client application 107. Similarly, in some embodiments, the test case code may be stored or otherwise maintained remotely (e.g., in the database 104) and retrieved by the client device 106 via the network 108 before execution at the client device 106.

Figure 3:
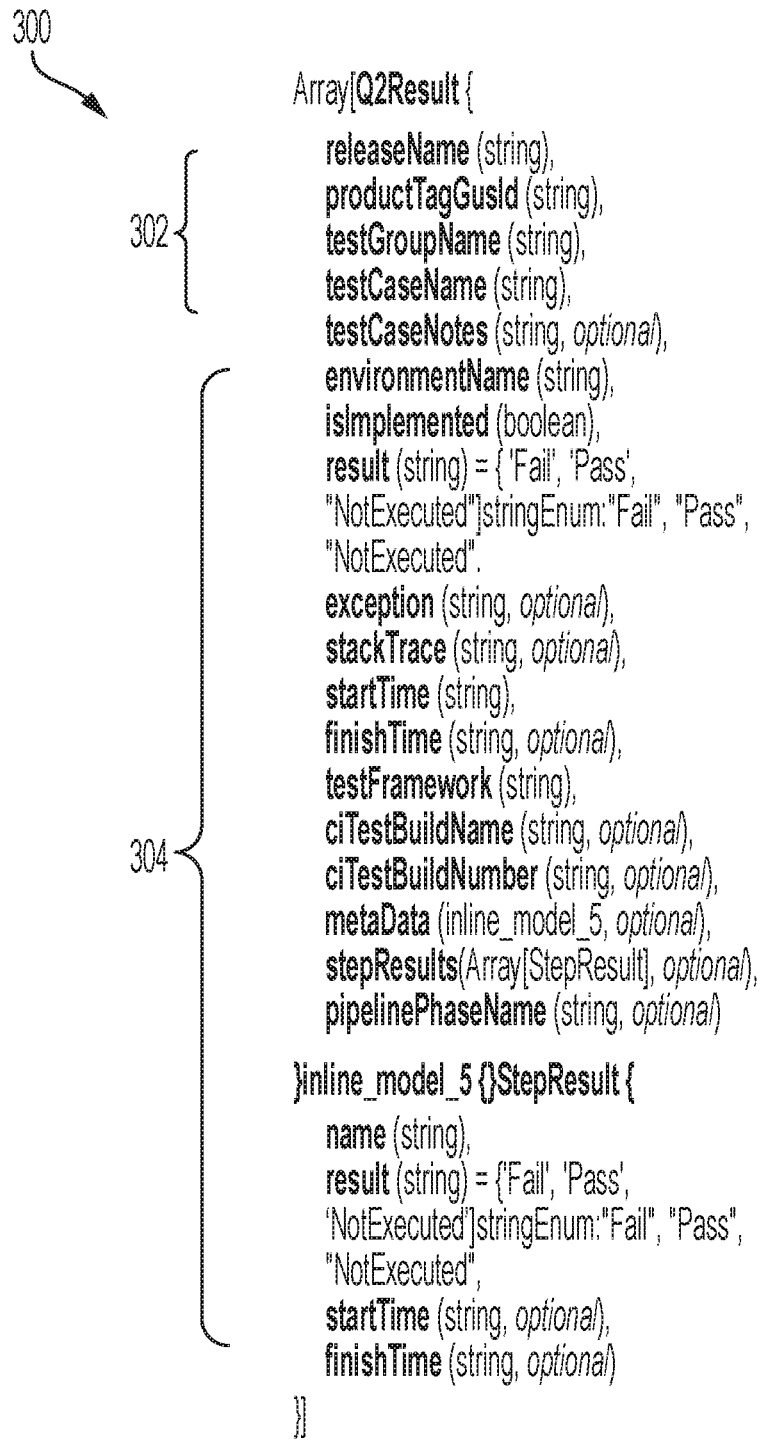
FIG. 3 depicts an exemplary format for a test result message suitable for use with the test case management process of FIG. 2.

Still referring to FIGS. 1-2, in exemplary embodiments, the server 102 maintains (e.g., in memory 122) one or more validation rules 130 that define the formatting for received test results to be supported by the test case manager 126. For example, FIG. 3 depicts an exemplary representation of a test result message format 300 that is realized as an array having a first portion 302 (or header portion) including a plurality of metadata fields that characterize or otherwise define the test case and a second portion 304 (or payload portion) including one or more fields that characterize the result of executing the test case for the current instance of execution or testing. A developer or other user writing source code for a test case may define or otherwise set the values for the various parameters included in the test result message format 300 within the source code for the test case and configure the source code of the test case to return or otherwise output an array having the prescribed metadata fields that is populated with the values defined within the test case source code. In this regard, as the test case source code is changed, the developer or other user may correspondingly change the values for different parameters within the test case source code, thereby allowing a new test case definition to be subsequently created automatically, which, in turn, may be utilized to track test results associated with the updated test case while also distinguishing those subsequent test results from those resulting from the previous version of the test case, without requiring any other manual involvement. When the received test result message is not provided in the valid format dictated by the validation rule(s) 130, the test case manager 126 discards or otherwise rejects the test result message and provides a corresponding response to the client device 106 and/or the client application 107 that indicates that the test results were not provided in the correct format (task 206). Conversely, when the received test result message is validated as being provided in the correct format, the test case manager 126 may provide a corresponding response to the client device 106 and/or the client application 107 that indicates the imported test result is accepted (e.g., HTTP response status code 202).

Referring again to FIGS. 1-2, in exemplary embodiments, the test case management process 200 queues or otherwise buffers the validated test result message before subsequently fetching or otherwise retrieving the validated test result message based on one or more performance criteria (tasks 208, 210). In this regard, the test case manager 126 places the validated test result message in a queue 132 to delay further processing of the test result message and thereby manage resources consumed for processing test results. Although FIG. 1 depicts the queue 132 being maintained at the server 102 (e.g., in memory 122), in practice, the test result messages may be queued at the database 104 or some other location on the network 108 (e.g., using a queueing service available on the network 108). In exemplary embodiments, the test case manager 126 monitors the size of the queue 132 (or the number of test result messages pending processing) and autonomously fetches test result messages at a rate or frequency that may dynamically vary based at least in part on the size of the queue 132. For example, the test case manager 126 may implement a test result API or similar component that monitors the usage of the server 102 resources and dynamically increases or decreases the rate at which test result messages are fetched from the queue 132 based on the relationship between the amount of available resources at the server 102 and the amount of test result messages pending processing.

Still referring to FIG. 2 with continued reference to FIG. 1, the test case management process 200 continues by automatically generating a test case definition associated with received test result message fetched from the queue based on a subset of the metadata fields associated with that test result message and then checks or otherwise queries the database to verify whether or not the generated test case definition matches an existing test case definition in the database (tasks 212, 214, 216). In the absence of an existing test case definition in the database that matches the automatically generated test case definition for the received test result message, the test case management process 200 automatically creates a new entry for the automatically generated test case definition in the database before storing or otherwise maintaining the test results in the database in association with that test case definition entry (tasks 218, 220).

In exemplary embodiments, the test case manager 126 concatenates or otherwise combines the values from different metadata fields of the test result message to construct the test case definition associated with the test result message, and then queries the test case definitions 110 in the database 104 for a matching test case definition. For example, referring to the test result message format depicted in FIG. 3, in one embodiment, the test result API of test case manager 126 may automatically generate the test case definition associated with a received test result message in that format by combining the product identifier associated with the test result message (e.g., the productTagGusID string value) with the test group (e.g., the testGroupName string value) and the test case name (e.g., the testCaseName string value) associated with the test result message. Thereafter, the test case manager 126 queries the test case definitions table 110 for an entry matching that identified combination of product identifier, test group, and test case name. In the absence of a matching entry in the test case definitions table 110, the test case manager 126 automatically creates a new entry in the test case definitions table 110 that maintains the test case definition (e.g., the identified combination of product identifier, test group, and test case name values in association with a unique identifier for the test case definition). The test case manager 126 then creates an entry in the test results data table 112 that maintains an association between the values obtained from the payload fields of the received test result message that quantify or otherwise characterize the test result (e.g., the results of the testing) and the corresponding test case definition entry in the test case definitions table 110 (e.g., using the unique identifier assigned to the test case definition).

For example, continuing the above example, if a test result message is received with a release metadata field value of MCET_215, a product identifier value of Journey Builder, a test group value of Journey Creation, and a test case name value of Can Create Journey through API, the test result API 150 concatenates the field values (e.g., MCET215JourneyBuilderJourneyCreationCanCreate-JourneythroughAPI) to create a test case identifier. In the absence of a matching TestCase object in the test case definitions table 110 assigned the same test case identifier, the test result API 150 creates a new TestCase object that maintains an association between the generated test case identifier and one or more additional fields. In this regard, to support the logical or hierarchical groupings described herein, in one or more embodiments, the TestCase object associates the test case identifier with the identifier of an entry for the Journey Creation test group in a test group table. To this end, if there is no Journey Creation test group entry in the test group table that is associated with a Journey Builder entry in the product table, the test result API 150 may create an entry for the Journey Creation test group in the test group table that is associated with the Journey Builder entry in the product table (and additionally create the Journey Builder entry in the product table as needed), with the TestCase object then being associated with the created Journey Creation test group entry in the test group table. That said, if there is already an existing Journey Creation test group entry in the test group table that is also associated with an existing Journey Builder entry in the product table, the test result API 150 may simply associate the new TestCase object with that existing Journey Creation test group entry. In this regard, multiple TestCase objects may be associated with a common Journey Creation test group entry, thereby allowing for a hierarchical or logical grouping of test case definitions that include or are otherwise associated with the Journey Creation test group. The test result API 150 also creates a new entry in the test results data table 112 that associates test result payload from the test result message received with a release metadata field value of MCET_215, a product identifier value of Journey Builder, a test group value of Journey Creation, and a test case name value of Can Create Journey through API with the newly created TestCase object in the test case definitions table 110.

On the other hand, if an existing test case definition in the database that matches the automatically generated test case definition for the received test result message, the test case management process 200 stores or otherwise maintains the test results in the database in association with that existing test case definition entry (task 222). For example, if the identified combination of product identifier, test group, and test case name associated with a received test result message matches an existing entry in the test case definitions table 110, the test case manager 126 may create a new entry in the test results data table 112 that maintains the values obtained from the payload fields of the received test result message that quantify or otherwise characterize the test result and then utilize the unique identifier associated with the existing test case definition entry in the test case definitions table 110 to associate that entry in the test results data table 112 with the appropriate test case definition entry in the test case definitions table 110. In this regard, as subsequently received test result messages continue to match an existing test case definition in the database 104, the test case manager 126 simply stores the test result payload of those test result messages in the database 104 and then associates those test result data entries with the existing test case definition in the test case definitions table 110.

For example, continuing the above example, if a subsequent test result message is received with a release metadata field value of MCET_215, a product identifier value of Journey Builder, a test group value of Journey Creation, and a test case name value of Can Create Journey through API, the test result API 150 concatenates the field values to create a test case identifier used to query the test case definitions table 110. In response to identifying the existing TestCase object entry in the table 110 having an identifier value equal to MCET215JourneyBuilderJourney-CreationCanCreateJourneythroughAPI, the test result API 150 simply creates a new entry in the test results data table 112 that associates test result payload from the subsequently received test result message with the existing TestCase object in the test case definitions table 110, for example, by providing the test case identifier or other reference to the existing TestCase object in the test case definitions table 110 in a column or field of the new test result entry in the table 112. That said, it should be noted that in some alternative embodiments, an existing entry in the test case definitions table 110 may be updated to include a reference or pointer to the newly created test result entry in the test results data table 112 to establish an association between the existing test case entry and new test results. For example, in such embodiments, a column or field of an entry in the test case definitions table 110 may include an array of values corresponding to the identifiers of the test result entries to be associated with that respective test case definition.

Figure 4:
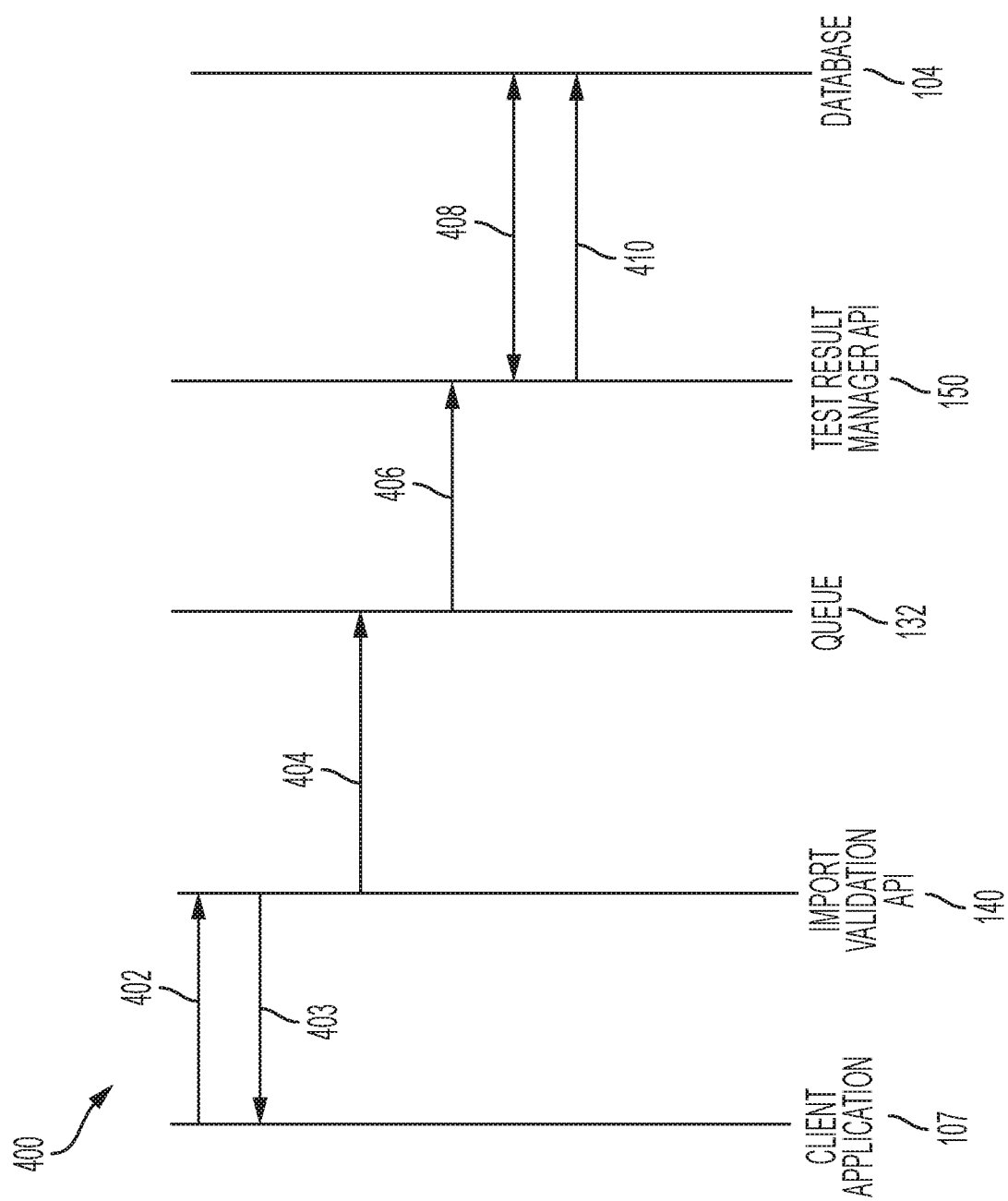
FIG. 4 depicts an exemplary sequence of communications within the computing system of FIG. 1 in connection with an exemplary embodiment of the test case management process of FIG. 2.

FIG. 4 depicts an exemplary sequence 400 of communications within the computing system 100 in accordance with one or more embodiments of the process 200 of FIG. 2. In this regard, FIG. 4 depicts an embodiment where the test case manager 126 is implemented using an import validation API 140 for validating and queueing received test results and a test result API 150 for autonomously fetching and processing the queued test results. Referring to FIG. 4 with continued reference to FIGS. 1-2, the sequence 400 begins with a client application 107 at the client device 106 transmitting 402 or otherwise providing a test result message to the import validation API 140 of the test case manager 126 by making a call to the import validation API 140. The import validation API 140 validates the format of the received test result message against the validation rules 130 maintained at the server 102 and transmits or otherwise provides 403 a response back to the client that indicates whether the received test results will be accepted (e.g., HTTP response status code 202) or rejected. It should be noted that the response 403 allows for the client to be quickly notified that the test result has been accepted while also allowing for the connection between the client application 107 and the import validation API 140 to be terminated, rather than waiting until the test result has been fully processed, which could take a variable amount of time (e.g., depending on the size of the queue 132, other system loading, etc.).

When the test result message is in the valid format for acceptance, the import validation API 140 adds 404 the validated test result message to the queue 132. In this regard, it should be noted that although FIG. 1 depicts the queue 132 as being implemented at the server 102, in practice, the import validation API 140 may transmit or otherwise provide the validated test result message to a queueing service on the network 108 that is separate from and/or independent of the server 102. The test case manager 126 continually monitors the size or number of test result messages maintained in the queue 132 as well as monitoring the resource utilization at the server 102, and the test result API 150 periodically and autonomously fetches or otherwise retrieves 406 a validated test result message from the queue 132 at a time, rate, and/or frequency that may dynamically vary based on the relationship between the size of the queue 132 and the relative utilization of the server 102. Thereafter, the test result API 150 automatically generates or otherwise determines a test case definition for the validated test result message fetched from the queue 132 and then queries or otherwise accesses 408 the database 104 to verify whether or not that test case definition matches an existing definition in the database 104. The test result API 150 then updates 410 the database 104 to maintain the test result payload data associated with the test result message in the test results data table 112, either in association with an existing test case definition entry in the test case definitions table 110 that matches the test case definition generated by the test result API 150, or alternatively, in association with a newly created test case definition entry in the test case definitions table 110 when the test case definition generated by the test result API 150 is unique relative to the previously-existing test case definitions in the test case definitions table 110.

By automatically generating test case definitions based on metadata fields and associating different test results with common test case definitions, the test results may be presented in a hierarchical manner that allows for users to drill down into different aspects of the testing or the underlying source code being tested. For example, each different metadata field that makes up the test case definition may be assigned or associated with a different rank or priority relative to the other metadata fields making up the test case definition, thereby allowing test results to be aggregated, classified, or otherwise categorized into different hierarchical groupings. Additionally, test results may also be analyzed across a respective grouping of test results to summarize the testing with respect to that hierarchical grouping in the aggregate.

It should also be noted that queueing the test results allows for the test results to be persisted in a manner that reduces probability of lost test results due to unexpected events that could occur between the time a test result is received and the time the test result is processed. Additionally, queueing the test results allows for parallel processing when sufficient computing resources are available or the size of the queue increases. For example, as the amount of pending test results in the queue increases, additional processing threads may be utilized to fetch and process multiple test results from the queue in parallel. In this regard, exemplary embodiments employ logic at the test result manager API 150 to prevent duplicate test case definitions due to race conditions. For example, the test result manager API 150 may utilize a semaphore or similar local variable that pauses one or more parallel threads when creation or instantiation of a new test case definition is occurring before those parallel threads determine whether not their respective generated test case definition matches an existing test case definition in the database.

Figure 5:
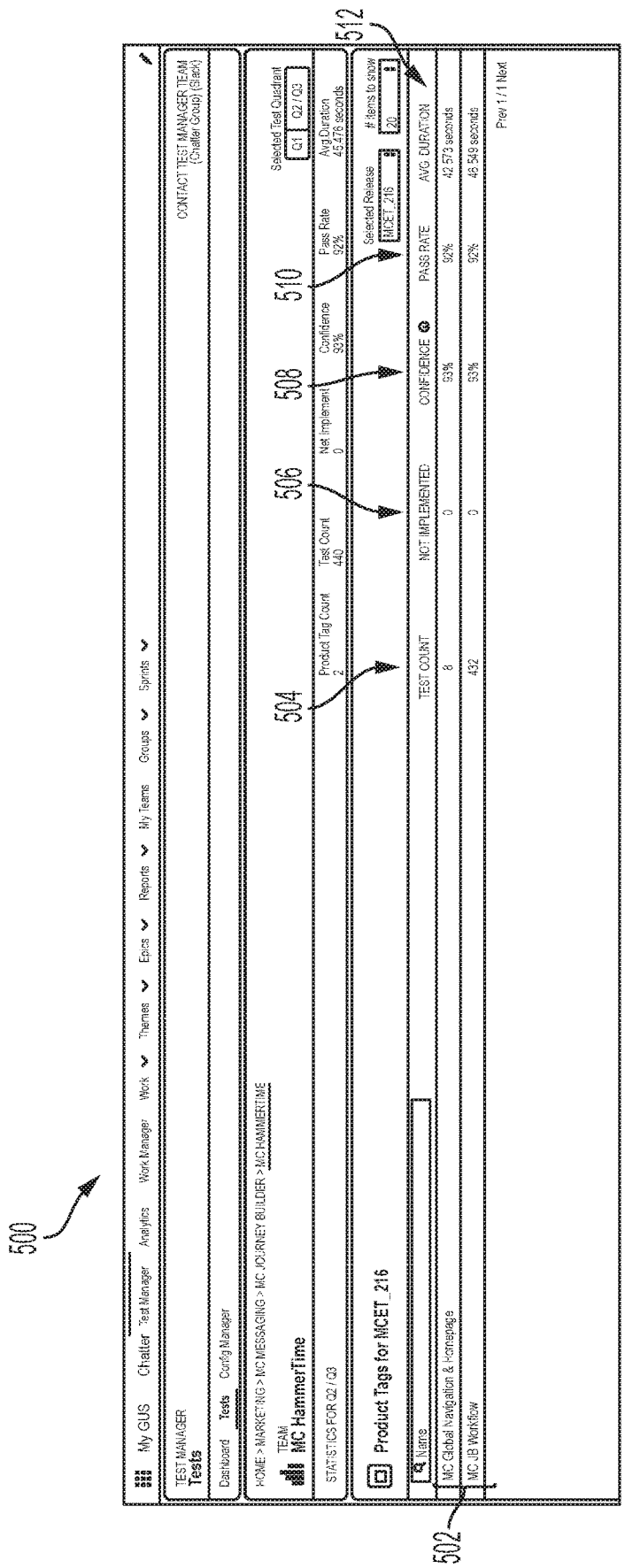
FIGS. 5-7 depict exemplary graphical user interface (GUI) displays suitable for presentation within a computing system in connection with the test case management process of FIG. 2 in accordance with one or more exemplary embodiments.
Figure 6:
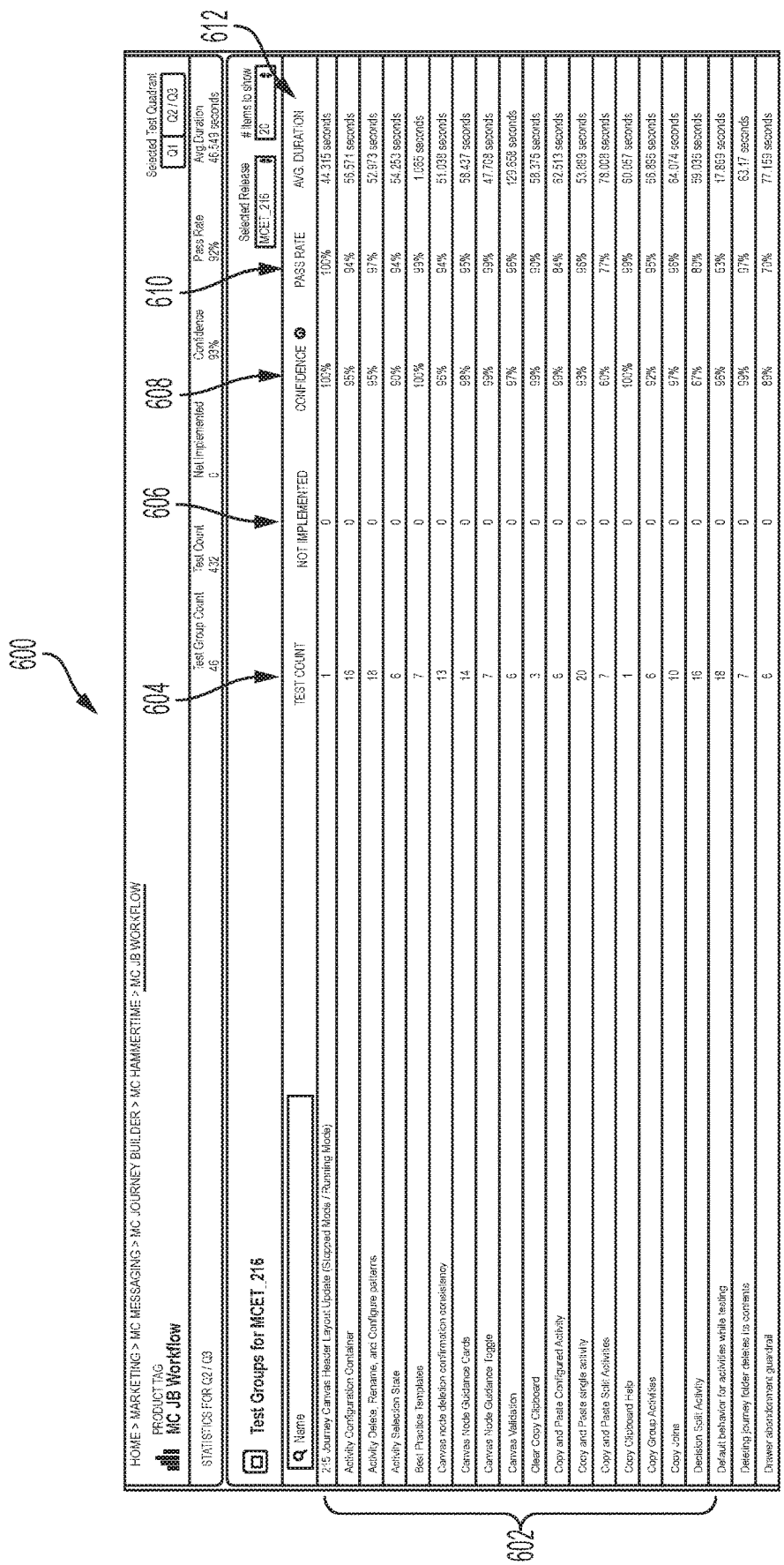
Figure 7:
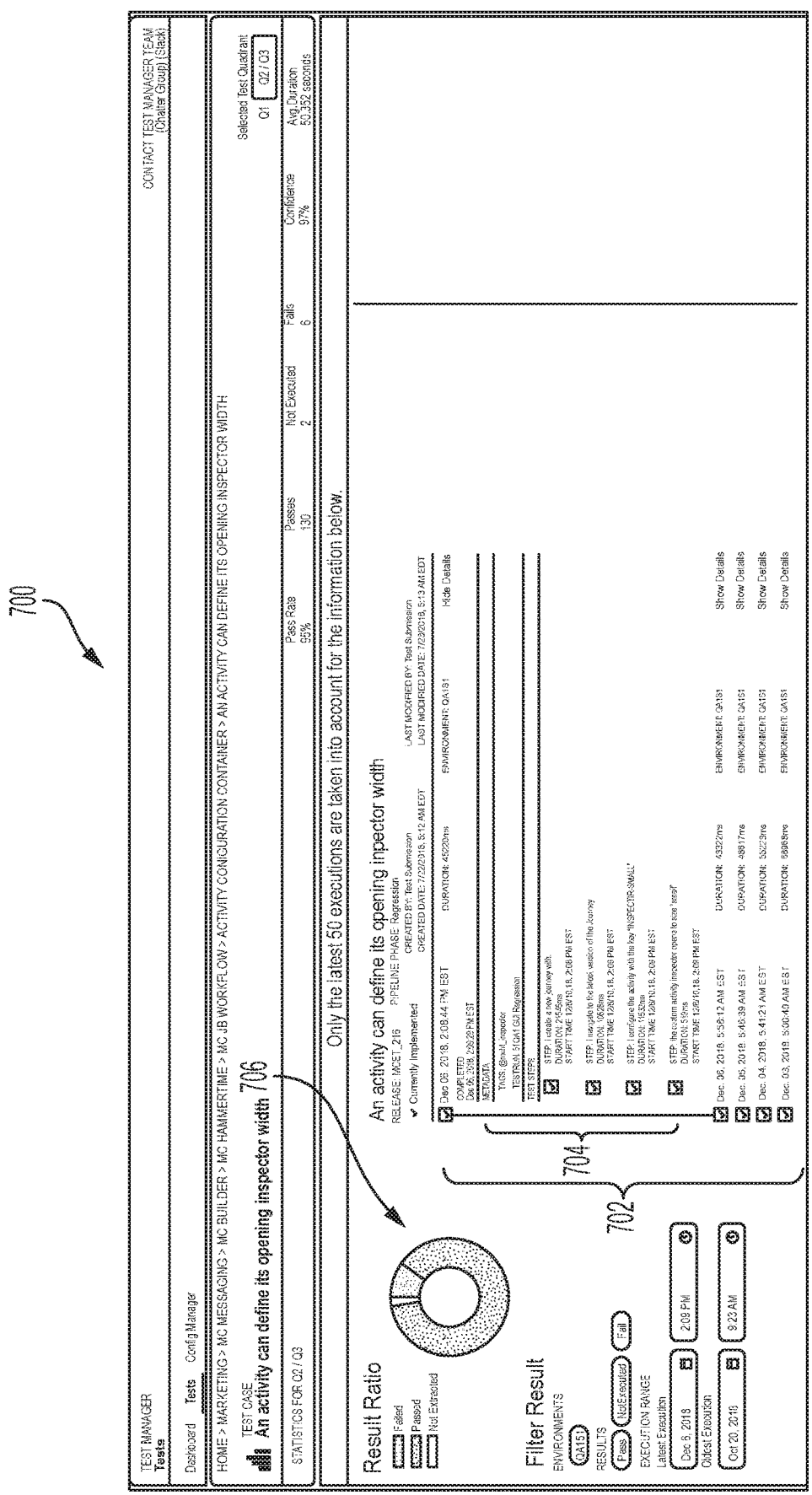

FIGS. 5-7 depict an exemplary sequence of GUI displays suitable for presentation by a client application 107 at the client device 106 in conjunction with the test case management process 200 of FIG. 2. For example, the test case manager 126 or another virtual application provided by an application platform 124 at an application server 102 capable of accessing the database 104 may generate or otherwise provide a GUI display 500 that includes a listing 502 of the test case definitions maintained by the database 104 grouped by the product identifier metadata field value (e.g., the productTagGusID string value) used to generate the respective test case definitions categorized therein. In this regard, test case definitions grouped by the product identifier metadata field represent a superset of the test case definitions that have a common product identifier metadata field value in their test case definition. The GUI display 500 includes a column 504 indicating the number of test case definitions categorized or classified under a respective product identifier along with additional columns 506, 508, 510, 512 that summarize the test results classified under that respective product identifier. In this regard, metrics summarizing the test results for a particular hierarchical grouping of test case definitions may be calculated or otherwise determined based on the individual test results associated with the various test case definitions classified within that hierarchical grouping. For example, for the illustrated embodiment, an average pass rate for test cases associated with the MC JB Workflow product identifier may be calculated or otherwise determined based on the pass rates associated with the various test results having an associated test case definition that includes the MC JB Workflow product identifier in the test case definition.

Referring now to FIG. 6, the product identifier test case definitions groupings may be depicted within the listing 502 using hyperlinks or other selectable GUI elements, and in response to selection of the MC JB Workflow grouping, an updated GUI display 600 may be provided that allows the user to further drill down into the test cases classified into the MC JB Workflow group. In this regard, the GUI display 600 includes an updated listing 602 of the test case definitions maintained by the database 104 that match the MC JB Workflow product identifier grouped by the test group metadata field value (e.g., the testGroupName string value) used to generate the respective test case definitions categorized therein. Similar to the GUI display 500, the GUI display 600 includes a column 604 indicating the number of test case definitions categorized or classified under a respective test group along with additional columns 606, 608, 610, 612 that summarize the test results classified under that respective test group. Again, metrics summarizing the test results for a particular test group may be calculated or otherwise determined based on the individual test results associated with the various test case definitions classified within that test group. For example, for the illustrated embodiment, an average pass rate for test cases associated with the Activity Configuration Container test group may be calculated or otherwise determined based on the pass rates associated with the various test results having an associated test case definition that includes both the MC JB Workflow product identifier and the Activity Configuration Container test group in the test case definition.

FIG. 7 depicts an exemplary test case GUI display 700 that may be presented when a user drills down into an individual test case definition. For example, in response to selection of the Activity Configuration Container test group from within the listing 602 on the GUI display 600, a further updated GUI display may be provided that lists the test case definitions maintained by the database 104 that match both the MC JB Workflow product identifier and the Activity Configuration Container test group. In response to selection of a particular test case definition from within the Activity Configuration Container test group (e.g., the testCaseName string value equal to "An activity can define its opening inspector width"), the test case GUI display 700 is generated that includes a listing 702 of the individual test results associated with that test case definition ordered sequentially in reverse chronological order. In this regard, the test results depicted in the test result listing 702 correspond to the individual test result entries in the test results data table 112 that are associated with the selected test case definition (e.g., the concatenation or combination of ReleaseName=MCET_216, productTagGusID=MC JB Workflow, testGroupName=Activity Configuration Container, and testCaseName=An activity can define its opening inspector width) in the test case definitions table 110. Selection of an individual test result from within the listing 702 results in presentation of an expanded detail region 704 that graphically depicts test result data associated with the selected test result entry in the test results data table 112. Additionally, a gauge chart 706 or other graphical representations that characterize or otherwise summarize the aggregate performance of the tests associated with the selected test case definition may be generated based on the test result data in the test results data table 112 associated with the selected test case definition. For example, aggregate pass or fail rates may be determined based on the ratio of the individual test results that pass or fail with respect to the total number of test results that are assigned to that common test case definition. Similarly, average test duration, confidence values, or other performance metrics associated with the test case definition may be calculated or determined based on the test result data in the test results data table 112 for the individual test results associated with the selected test case definition.

It should be appreciated that the subject matter described herein is not intended to be limited to any particular GUI display or manner of presenting the test results. In this regard, any number of dashboards or visualizations may be generated based on the test results for different test case definitions or various supersets or subsets of test results across different test case definitions based on the metadata field values utilized to generate the test case definitions and classify test results accordingly. For example, the test result data 112 and/or the test case definitions 110 may be provided to a data analytics platform or other system configured to generate reports, dashboards, and/or visualizations of any degree of complexity and/or richness.

Figure 8:
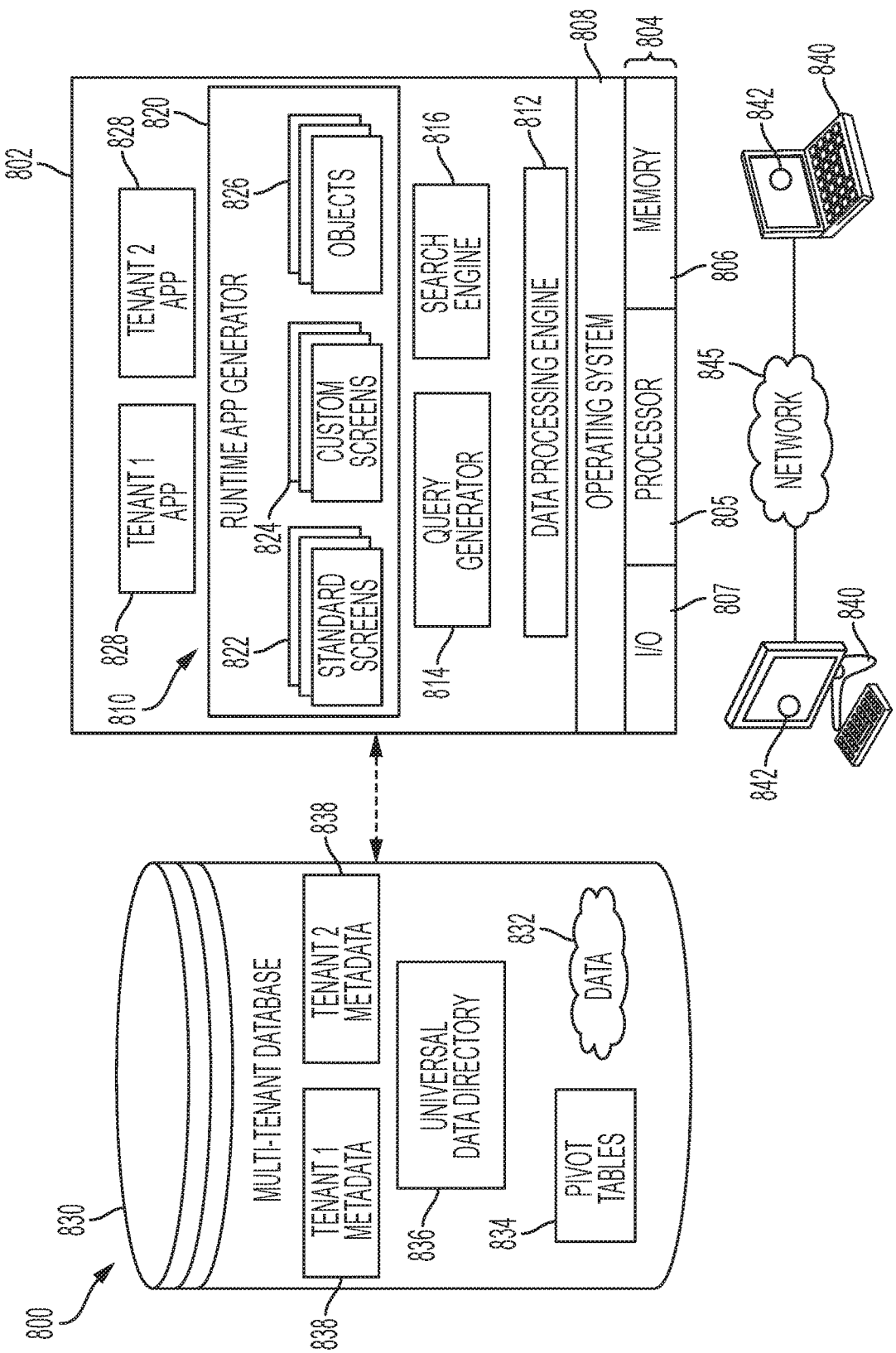
FIG. 8 is a block diagram of an exemplary multi-tenant system suitable for use with the computing system of FIG. 1 in accordance with one or more embodiments.

FIG. 8 depicts an exemplary embodiment of an on-demand multi-tenant database system 800 suitable for use with the test case management process 200 of FIG. 2 or the computing system 100 of FIG. 1. The illustrated multi-tenant system 800 of FIG. 8 includes a server 802, such as server 102, that dynamically creates and supports virtual applications 828 based upon data 832 from a common database 830 (e.g., database 104) that is shared between multiple tenants, alternatively referred to herein as a multi-tenant database. Data and services generated by the virtual applications 828 are provided via a network 845 (e.g., network 108) to any number of client devices 840 (e.g., client device 106), as desired. Each virtual application 828 is suitably generated at run-time (or on-demand) using a common application platform 810 (e.g., application platform 124) that securely provides access to the data 832 in the database 830 for each of the various tenants subscribing to the multi-tenant system 800. In this regard, depending on the embodiment, the test case management process 200 may be utilized in connection with testing virtual applications 828 provided by or on the application platform 810, or a virtual application 828 generated by the application platform 810 may be utilized to review and analyze test results maintained in the database 830, for example, as described above in the context of FIGS. 5-7. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

Still referring to FIG. 8, the server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 807 and the like. The input/output features 807 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long-term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 808. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 (e.g., client application 107) executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to querying and other database functions, software development and/or testing, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of managing test cases using a database, the method comprising:
    receiving, by a server over a network, a first test result message including a first header portion and a first payload including first test results characterizing a result of executing a first test case, wherein:
        the first header portion comprises first values characterizing at least one of a test group name field and a test case name field; and
        the first values are defined within source code for the first test case;
    automatically generating, by the server, a test case definition corresponding to the first test case by concatenating the first values for the first header portion of the first test result message to generate a unique identifier for the test case definition;
    creating, by the server, a first entry in the database in a test case definitions table that maintains the unique identifier;
    creating, by the server, a second entry in a test results data table in the database that maintains an association between the first test results and the first entry in the test case definitions table;
    receiving, by the server over the network, a second test result message including a second header portion and a second payload including second test results characterizing a second result of executing a second test case, wherein:
        the second header portion comprises second values characterizing at least one of the test group name field and the test case name field; and
        the second values are defined within source code for the second test case;
    automatically generating, by the server, a second test case definition by concatenating the second values for the second header portion of the second test result message to obtain the second test case definition; and
    when the second test case definition matches the unique identifier for the test case definition, updating the database to maintain an association between the test case definition and the second test results.

2. The method of claim 1, wherein updating the database comprises storing the second test results in the database in association with the first entry.

3. The method of claim 2, the first entry comprising a test case definition entry in the test case definitions table in the database, wherein storing the second test results comprises:
    creating a second test result entry in the database, the second test result entry maintaining the second test results; and
    providing a reference to the test case definition entry in a field of the second test result entry.

4. The method of claim 1, wherein updating the database comprises updating the first entry in the database to maintain the association between the test case definition and the second test results.

5. The method of claim 4, the first entry comprising a test case definition entry in the test case definitions table in the database, wherein:

updating the database comprises creating a second test result entry in the database, the second test result entry maintaining the second test results; and updating the first entry comprises updating the test case definition entry to include a reference to the second test result entry in the database.

6. The method of claim 1, further comprising validating a format of the first test result message prior to automatically generating the test case definition.

7. The method of claim 1, further comprising providing a graphical user interface (GUI) display including a graphical representation associated with the test case definition, wherein the graphical representation is influenced by the first and second test results.

8. The method of claim 1, wherein the first header portion comprises an array populated with the first values defined within the source code for the first test case.

9. The method of claim 1, further comprising querying, by the server, the test case definitions table in the database using the second test case definition for an existing entry matching the second test case definition.

10. The method of claim 9, the existing entry comprising the first entry, wherein updating the database to maintain an association between the test case definition and the second test results comprises updating the database to maintain an association between the existing entry in the test case definitions table and the second test results.

11. The method of claim 1, wherein updating the database to maintain the association between the first entry in the test case definitions table and the second test results comprises creating a third entry in the test results data table in the database that maintains an association between the second test results and the first entry in the test case definitions table.

12. A database system comprising:
a database including a test case definitions table; and
a server coupled to the database and a network to:
receive a plurality of test result messages via the network, each test result message of the plurality including a header portion and a payload portion comprising test results associated with an instance of execution of a respective test case, wherein the plurality of test result messages includes a first test result message including a first header portion and a first payload including first test results characterizing a result of executing a first test case and a second test result message including a second header portion and a second payload including second test results characterizing a second result of executing a second test case, wherein the first header portion comprises first values characterizing at least one of a test group name field and a test case name field defined within source code for the first test case, and the second header portion comprises second values characterizing at least one of the test group name field and the test case name field defined within source code for the second test case; and
for each test result message:
automatically generate a respective test case definition by concatenating values of a subset of the header portion for the respective test result message to obtain an identifier for the respective test case definition;
when the identifier for the respective test case definition is unique with respect to test case definitions maintained in the test case definitions table:
create a new entry for the respective test case definition in the test case definitions table that maintains the identifier for the respective test case definition; and
store the respective test results for the respective test result message in a respective entry in a test results data table in the database that maintains an association between respective test results and the new entry; and
when the respective test case definition matches an existing entry maintained in the test case definitions table, store the respective test results for the respective test result message in the database in association with the existing entry, wherein:
a test case definition corresponding to the first test case comprises a combination of the first values for a subset of the first header portion of the first test result message;
a second test case definition corresponding to the second test case comprises a combination of the second values for the subset of the second header portion of the second test result message; and
the database maintains an association between the test case definition and the second test results when the second test case definition matches the test case definition.

13. The database system of claim 12, wherein the server comprises a first application program interface to validate a format of each test result message prior to automatically generating the respective test case definition.

14. The database system of claim 13, wherein the first application program interface queues each test result message after validating the format.

15. The database system of claim 14, wherein the server comprises a second application program interface to autonomously fetch each test result message prior to automatically generating the respective test case definition.

16. A non-transitory machine-readable storage medium that provides instructions that, when executed by a processor, are configurable to cause said processor to perform operations comprising:
receiving, from a network, a first test result message including a first header portion and a first payload including first test results characterizing a result of executing a first test case, wherein:
the first header portion comprises first values characterizing at least one of a test group name field and a test case name field; and
the first values are defined within source code for the first test case;
automatically generating a test case definition corresponding to the first test case by concatenating the first values for the first header portion of the first test result message to generate a unique identifier for the test case definition;
creating a first entry in a database in a test case definitions table that maintains the unique identifier;
creating a second entry in a test results data table in the database, wherein the second entry maintains an association between the first entry and the first test results;
receiving, from the network, a second test result message including a second header portion and a second payload including second test results characterizing a second result of executing a second test case, wherein:

the second header portion comprises second values characterizing at least one of the test group name field and the test case name field; and the second values are defined within source code for the second test case;

automatically generating a second test case definition by concatenating the second values for the second header portion of the second test result message to obtain the second test case definition; and when the second test case definition matches the unique identifier for the test case definition, updating the database to maintain an association between the test case definition and the second test results.

* * * * *